(12) United States Patent
Grobnic et al.

(10) Patent No.: US 10,156,680 B2
(45) Date of Patent: Dec. 18, 2018

(54) FORMING AN OPTICAL GRATING WITH AN APPARATUS PROVIDING AN ADJUSTABLE INTERFERENCE PATTERN

(71) Applicant: NATIONAL RESEARCH COUNCIL OF CANADA, Ottawa (CA)

(72) Inventors: Dan Grobnic, Ottawa (CA); Stephen J. Mihailov, Kanata (CA); Robert B. Walker, Spencerville (CA); Ping Lu, Ottawa (CA); Huimin Ding, Nepean (CA); David Coulas, Ottawa (CA)

(73) Assignee: National Research Council of Canada, Ottawa, Ontario (CA)

( * ) Notice: Subject to any disclaimer, the term of this patent is extended or adjusted under 35 U.S.C. 154(b) by 0 days.

(21) Appl. No.: 15/325,247

(22) PCT Filed: Jul. 10, 2015

(86) PCT No.: PCT/CA2015/000429
§ 371 (c)(1),
(2) Date: Jan. 10, 2017

(87) PCT Pub. No.: WO2016/004511
PCT Pub. Date: Jan. 14, 2016

(65) Prior Publication Data
US 2017/0192168 A1 Jul. 6, 2017

Related U.S. Application Data

(60) Provisional application No. 62/023,228, filed on Jul. 11, 2014.

(51) Int. Cl.
*G02B 6/34* (2006.01)
*G02B 6/02* (2006.01)
*G02B 5/18* (2006.01)

(52) U.S. Cl.
CPC ........... *G02B 6/34* (2013.01); *G02B 6/02057* (2013.01); *G02B 6/02133* (2013.01);
(Continued)

(58) Field of Classification Search
CPC .. G02B 6/34; G02B 6/02123; G02B 6/02133; G02B 6/02138; G02B 6/02142; G02B 6/02147; G02B 5/1857
(Continued)

(56) References Cited

U.S. PATENT DOCUMENTS

| 4,807,950 A | 2/1989 | Glenn et al. ............... 385/123 |
| 5,307,184 A * | 4/1994 | Nishiwaki .............. G02B 5/001 |
| | | 359/30 |

(Continued)

FOREIGN PATENT DOCUMENTS

| WO | 99/59009 | 11/1999 | ............... G02B 6/16 |
| WO | 03/032038 | 4/2003 | ............... G02B 6/16 |

OTHER PUBLICATIONS

Q. Zhang et al. "Tuning Bragg wavelength by writing gratings in prestrained fibers", Photonics Technology Letters, vol. 6, No. 7, Jul. 1994.
(Continued)

*Primary Examiner* — Robert Tavlykaev
(74) *Attorney, Agent, or Firm* — Teitelbaum Bouevitch & McLachlen; Neil Teitelbaum

(57) ABSTRACT

An apparatus for use with a pulsed laser source for forming an optical grating in a target includes an adjustable telescope having an element with a negative optical power, for generation of a diverging optical beam, so that the optical beam has adjustable divergence upon exiting the telescope while focusing of light inside the telescope is avoided. A transmission diffraction grating is disposed in the optical beam exiting the telescope, for forming an optical interference
(Continued)

pattern on the target. Optical gratings with different grating periods may be formed by adjusting the divergence of the optical beam exiting the telescope. Lack of tight focal spots inside the telescope enables use of ultrashort pulse duration, high peak intensity laser sources.

20 Claims, 9 Drawing Sheets

(52) U.S. Cl.
CPC ..... *G02B 6/02138* (2013.01); *G02B 6/02147* (2013.01); *G02B 5/18* (2013.01); *G02B 2005/1804* (2013.01)

(58) Field of Classification Search
USPC .................. 385/37; 65/485; 359/399, 566
See application file for complete search history.

(56) References Cited

U.S. PATENT DOCUMENTS

| | | | | |
|---|---|---|---|---|
| 5,367,588 | A | 11/1994 | Hill et al. ......................... | 430/5 |
| 5,655,040 | A | 8/1997 | Chesnoy et al. ................ | 385/37 |
| 6,072,926 | A | 6/2000 | Cole et al. ...................... | 385/37 |
| 6,269,208 | B1 | 7/2001 | Bhatia et al. .................... | 385/37 |
| 6,275,631 | B1* | 8/2001 | Jang .................. | G02B 6/02142 |
| | | | | 385/123 |
| 6,501,883 | B1* | 12/2002 | Painchaud ......... | G02B 6/02138 |
| | | | | 359/566 |
| 6,628,863 | B2* | 9/2003 | Jang .................. | G02B 6/02095 |
| | | | | 385/123 |
| 6,643,066 | B2 | 11/2003 | Couillard et al. ............ | 359/573 |
| 6,687,435 | B2* | 2/2004 | Koo .................. | G02B 6/02138 |
| | | | | 385/124 |
| 6,993,221 | B2 | 1/2006 | Mihailov et al. ............... | 385/37 |
| 7,031,571 | B2 | 4/2006 | Mihailov et al. ............... | 385/37 |
| 2002/0018621 | A1* | 2/2002 | Park .................. | G02B 6/02142 |
| | | | | 385/37 |
| 2003/0035623 | A1* | 2/2003 | Wilcox .............. | G02B 6/02133 |
| | | | | 385/37 |
| 2004/0227927 | A1 | 11/2004 | Battiato .......................... | 356/37 |
| 2009/0274420 | A1 | 11/2009 | Vallee et al. .................... | 385/37 |
| 2011/0127697 | A1* | 6/2011 | Milne ................. | B23K 26/046 |
| | | | | 264/400 |
| 2013/0153553 | A1 | 6/2013 | Lasagni .................. | 219/121.69 |
| 2016/0320750 | A1* | 11/2016 | Zhou ................. | G02B 27/0012 |

OTHER PUBLICATIONS

J.D. Prohaska et al. "Magnification of mask fabricated fibre Bragg gratings", Electronics Letters, vol. 29, No. 18, Sep. 1993.
Voigtländer et al. "Ultrashort pulse inscription of tailored fiber Bragg gratings with a phase mask and a deformed wavefront", Optical Materials Express, vol. 1, No. 4, p. 633-642 (2011).
Song et al. "Tunable Direct Writing of FBGs into a Non-Photosensitive Tm-Doped Fiber Core with an fs Laser and Phase Mask", Chinese Physics Letters vol. 26 No. 9, paper 094204 (2009).
Mihailov et al. "Bragg Gratings Written in All-SiO2 and Ge-Doped Core Fibers With 800-nm Femtosecond Radiation and a Phase Mask" Journal of Lightwave Technology vol. 22 No. 1 p. 94 (2004).
PCT/CA2015/000426 Search Report dated Sep. 23, 2015.
Riant et al. "New fabrication technique of fibre Bragg gratings with arbitrary chirp and wavelength for chromatic dispersion compensation" 24th European Conference on Optical Communication ECOC '98 Jan. 1, 1998.
EP 15818425—Search Report dated Jan. 17, 2018.

* cited by examiner

FORMING AN OPTICAL GRATING WITH AN APPARATUS PROVIDING AN ADJUSTABLE INTERFERENCE PATTERN

RELATED APPLICATION DATA

This application is the national stage entry of International Appl. No. PCT/CA2015/000429, filed Jul. 10, 2015, which claims priority to U.S. Provisional Patent Application No. 62/023,228, filed Jul. 11, 2014. All claims of priority to that application are hereby made, and that application is hereby incorporated in its entirety by reference.

TECHNICAL FIELD

The present invention relates to optical devices manufacturing equipment and methods, and in particular to equipment and methods for manufacturing optical gratings.

BACKGROUND OF THE INVENTION

Fiber Bragg grating (FBG) optical filters are used extensively in optical networks for stabilization of semiconductor pump lasers employed in erbium doped optical amplifiers, as well as for wavelength division multiplexing and dispersion compensation of wavelength channels propagating in the optical networks. FBGs also attracted considerable attention for use as sensors in monitoring of civil structures, and for sensing temperature and strain in various environments. Each FBG has a characteristic retro-reflective Bragg resonance at a Bragg resonance wavelength $\lambda_{Br}$. The Bragg resonance wavelength $\lambda_{Br}$ is dependent on periodicity of the grating within the optical fiber, and on the effective refractive index of the fiber core. The Bragg resonance wavelength $\lambda_{Br}$ is defined by:

$$\lambda_{Br} = 2 n_{eff} \Lambda \quad (1)$$

wherein $n_{eff}$ is an effective refractive index for the resonating guided core mode, and $\Lambda$ is a period of the grating within the waveguide.

FBGs are usually manufactured using high power ultraviolet (UV) laser systems operating in a nanosecond pulse or a continuous wave (cw) regime. Typically, FBGs are generated by exposing a UV-photosensitive core of a germanium doped silica core optical fiber to a spatially modulated UV laser beam, to create permanent refractive index changes in the fiber core. Such a spatially modulated UV beam can be created by using a two-beam interference technique disclosed in U.S. Pat. No. 4,807,950 by Glenn et al., or by using a specialized transmission diffraction grating disclosed in U.S. Pat. No. 5,367,588 by Hill et al. In a Hill et al. device, a phase mask is precision etched in a glass substrate, such as silica, to optimize coupling of incident laser light at a given wavelength into a pair of first diffraction orders, and suppressing coupling into the $0^{th}$ transmission order. Phase masks are often preferred to bulk interferometers for creation of light interference patterns, because bulk interferometers can be less stable and more difficult to use in production environments. Phase masks are more stable, but have less flexibility for adjusting the period of their resulting light interference patterns. For gratings induced with collimated UV laser light and a phase mask, the grating period $\Lambda$ is related to mask period $\Lambda_{mask}$ by $$\Lambda_{mask} = 2\Lambda \quad (2)$$

In a typical production environment, an inventory of phase masks is maintained to manufacture gratings with different Bragg resonances. Each phase mask can be very costly. Changing and aligning masks to produce different grating resonances on a production line is a time-consuming and tedious process. It is therefore desirable to have a capability to fabricate gratings with different Bragg resonances from a single phase mask, without having to perform a complicated alignment procedure.

Several techniques have been developed, in which a phase mask having a fixed period $\Lambda_{mask}$ is used to manufacture Bragg gratings having different periods $\Lambda$. By way of example, Q. Zhang et al. in a paper entitled "Tuning Bragg wavelength by writing gratings in prestrained fibers", published in Photonics Technology Letters, vol. 6, no. 7, July 1994, present a technique, in which an optical fiber is exposed to an interference pattern generated by a phase mask, while the optical fiber is under tensile strain. When the strain is relieved after the grating inscription, $\lambda_{Br}$ is shifted to lower wavelengths with respect to a similar inscription performed using the same phase mask in unstrained fiber.

Only a small amount of strain can be tolerated by optical fibers, so the amount of $\lambda_{Br}$ adjustment by approach of Zhang et al. is limited. For Bragg gratings written in standard single-mode germanium-doped telecom fiber, such as Corning SMF-28, with $\lambda_{Br}$ in the 1550 nm telecommunication band, the achievable tuning of $\lambda_{Br}$ is less than 2 nm. A variation on this technique is taught by Couillard et al. in U.S. Pat. No. 6,643,066, where the silica phase mask itself is compressed or stretched in order to vary the resultant period of the fiber grating. Again, the maximal amount of tuning of $\lambda_{Br}$ is approximately 2 nm.

Another technique, presented by J. D. Prohaska et al. in a paper entitled "Magnification of mask fabricated fibre Bragg gratings", published in Electronics Letters, Vol. 29, no. 18, September 1993, uses illumination of a phase mask with diverging or converging ultraviolet laser beams. Referring to FIG. 1, a Prohaska apparatus 10 is shown. An ultraviolet laser beam 11 propagates through a convex lens 12 having a focal length f. Then, the ultraviolet laser beam 11 propagates through a phase mask 13 and impinges onto a photosensitive optical fiber 14. In operation, the phase mask 13 generates converging diffracted beams 15A and 15B, which create an interference pattern 16 having converging fringes 17. Prohaska teaches that magnification M of the Bragg grating period within the fiber 14 is defined by the following equation:

$$M = \frac{f - p - q}{f - p} \quad (3)$$

wherein p is a distance between the convex lens 12 and the phase mask 13, and q is a distance between the phase mask 13 and the fiber 14.

Detrimentally, only small changes in periodicity can be achieved by Prohaska method, for the following reason. Light interference patterns produced at a distance from the phase mask are limited by a spot size and a spatial coherence of the illuminating laser beam. Typical UV sources used for grating inscription are excimer laser systems, which have spatial coherence lengths of less than one millimeter. A small coherence length of the UV laser source results in small values of q, which results in the values of M close to unity. To produce a magnification effect of any significance, the phase mask to fiber distance needs to be at least several millimeters. This distance is beyond the spatial coherence of most excimer laser UV systems used to inscribe Bragg gratings. Alternative UV systems include frequency doubled argon ion lasers which have better spatial coherence, but sub-millimeter beam sizes. To ensure sufficient overlap of diffracted orders to create an interference pattern, the phase mask to fiber distance cannot be greater than 1 mm in argon ion laser based systems. It is noted that coherent UV beams from a frequency doubled argon ion laser can have their beam diameters expanded, which would allow for a greater phase mask to fiber distance. However, the beam intensity of an expanded beam is much lower. Because the grating strength is linearly dependent on exposure time, a wide low-intensity beam could eventually write a grating after a lengthy exposure. However, long writing times with an expanded frequency-doubled argon ion laser beam might not be practical from a manufacturing standpoint.

Bhatia et al. in U.S. Pat. No. 6,269,208 disclose a method to improve a spatial coherence of an excimer laser UV beam to increase the phase mask to fiber distance, to enhance the magnification effect. Bhatia et al. teach that a coherence length of an excimer laser beam may be increased by spatially filtering the laser beam using an aperture. A convex lens is placed in an optical beam path downstream of the aperture. By varying a distance between the aperture and the convex lens, one can vary a divergence of the beam exiting the convex lens and incident on the phase mask. The spatial filtering increases the spatial coherence of the laser beam, allowing for increased distance between the phase mask and the photosensitive waveguide.

One disadvantage of this approach is that significant writing power of the laser beam is lost as a result of the spatial filtering, while the spatial coherence of the beam is only marginally improved. For a standard excimer laser, the improvement in the spatial coherence length, which defines the maximum distance between the phase mask and fiber, is increased from 0.5 mm to approximately 2 mm. Larger phase mask to fiber distances are needed in order to get a wavelength tunability of the Bragg grating of over 5 nm.

Cole et al. in U.S. Pat. No. 6,072,926 teaches a technique for adjusting the period of a fiber Bragg grating by laterally displacing the phase mask and the UV beam along the fiber axis during the writing process. The phase mask to fiber distance is kept within the spatial coherence length of the UV laser, which is less than 1 mm. The tuning range of the generated Bragg grating for a given phase mask was also limited, approximately 1 nm or less. The adjustment range increases as the width of the collimated UV beam on the phase mask is reduced, however reduced beam size requires that the fiber be directly adjacent the phase mask to ensure sufficient overlap of orders diffracted by the phase mask, to create the required interference pattern. Precision translation stages are needed to translate both the optical fiber and the phase mask with respect to each other.

In all the above cases, practical wavelength tuning will produce wavelength differences in a telecom wavelength band of 1525 nm to 1565 nm of only a few nanometers at best. Painchaud et al. in U.S. Pat. No. 6,501,883 disclosed a grating inscription technique based on a combination of phase mask scanning along the optical fiber taught by Cole, and beam focusing taught be Bhatia. The Painchaud et al. technique is capable of increasing the variation in wavelengths produced from a single phase mask by an order of magnitude, up to 20 nm. Detrimentally, expensive translation and alignment stages are required to precisely control a relative motion between the phase mask and the optical fiber waveguide.

Recently, femtosecond infrared lasers coupled with phase masks have been used to obtain Bragg gratings in optical waveguides not sensitive to ultraviolet light. Mihailov et al. in U.S. Pat. Nos. 6,993,221 and 7,031,571 disclose techniques for fabrication of Bragg grating structures in optical fibers and waveguides using a phase mask illuminated by an ultrafast laser source having a pulse duration of less than 500 fs. The resultant grating structures have a high amplitude of refractive index modulation, over $1 \times 10^{-3}$. The induction of index change is much more efficient using femtosecond pulse duration infrared radiation in comparison with continuous wave or nanosecond pulse duration UV radiation.

The approach of illuminating phase masks with non-collimated femtosecond laser beams to arrive at different grating pitches has been demonstrated by Voigtländer et al. in an article entitled "Ultrashort pulse inscription of tailored fiber Bragg gratings with a phase mask and a deformed wavefront", published in Optical Materials Express, vol. 1, no. 4, pg. 633-642 (2011), and by Song et al. in an article entitled "Tunable Direct Writing of FBGs into a Non-Photosensitive Tm-Doped Fiber Core with an fs Laser and Phase Mask", published in Chinese Physics Letters vol. 26 no. 9, paper 094204 (2009). In both cases, the non-collimated beam is created by introducing a singlet cylindrical lens before the phase mask. The singlet cylindrical lens has its axis of curvature parallel to the lines of the phase mask.

Although large wavelength shifts of about 40 nm were demonstrated by Song et al., the shift in Bragg resonance is fixed by the focal distance of the cylindrical lens, for a given phase mask to fiber distance. From a production point of view, the phase mask to fiber distance needs to be kept constant, because any change of phase mask to fiber distance results in a change of diffracted order overlap, causing a variation of an overall grating length and, accordingly, resulting in a variation of spectral properties of the grating, such as reflectivity and bandwidth. Therefore, if a grating period is to be changed, the cylindrical lens needs to be changed. This change results in a discrete variation of the grating period, and requires tedious and time-consuming re-alignment of the manufacturing setup.

SUMMARY OF THE INVENTION

It is an object of the invention to address deficiencies of the prior art.

In accordance with the invention, there is provided an apparatus for forming an optical grating in a target extending in a first direction, the apparatus comprising:

a telescope comprising:

a first optical element having negative optical power in a first plane including the first direction, for receiving a first optical beam and for forming a diverging optical beam therefrom; and a second optical element having positive optical power in the first plane, disposed downstream of the first optical element, for receiving the diverging optical beam and for forming a second optical beam therefrom;

a telescope support for supporting the first and second optical elements, the telescope support comprising a movable portion for adjusting a divergence of the second optical beam by adjusting a distance between the first and second optical elements; and a transmission diffraction grating disposed downstream of the telescope, for receiving the second optical beam and for splitting the second optical beam into first and second sub-beams;

wherein in operation, when the first optical beam is received by the first optical element, the first and second sub-beams overlap on the target and form an optical interference pattern on the target for forming the optical grating therein, wherein the optical interference pattern has a period dependent on the divergence of the second optical beam, whereby a period of the optical grating is adjustable by adjusting the distance between the first and second optical elements of the telescope.

Preferably, the apparatus is used with a laser source having a pulse duration of no greater than 10 ps. A joining member may be provided for holding the fiber holder and the transmission diffraction grating at a fixed distance from each other. A translator may be mechanically coupled to the joining member and the telescope, for displacing one of the joining member and the telescope in the first direction relative to the other of the joining member and the telescope. The displacement may be performed in a coordinated fashion, so as to lessen a shift of optical interference fringes on the target, e.g. along an optical fiber, when the translator displaces the telescope relative to the joining member.

In accordance with the invention, there is further provided a method for forming an optical grating in a target using the above apparatus, the method comprising:

(a) adjusting the distance between the first and second optical elements of the telescope, to adjust the period of the optical interference pattern extending in the first direction;

(b) providing the first optical beam, so as to form the optical interference pattern on the target; and (c) forming the optical grating in the target.

Preferably, the first optical beam is provided by a pulsed laser source having a pulse duration of no greater than 10 ps. In one embodiment, the method further includes (d) displacing one of the joining member and the telescope in the first direction relative to the other of the joining member and the telescope; and (e) while performing step (d), varying the distance between the first and second optical elements in a coordinated fashion with displacement of step (d), so as to lessen a shift of peaks of the optical interference pattern on the optical fiber.

BRIEF DESCRIPTION OF THE DRAWINGS

Exemplary embodiments will now be described in conjunction with the drawings, in which.

DETAILED DESCRIPTION OF THE INVENTION

While the present teachings are described in conjunction with various embodiments and examples, it is not intended that the present teachings be limited to such embodiments. On the contrary, the present teachings encompass various alternatives and equivalents, as will be appreciated by those of skill in the art.

Figure 1:
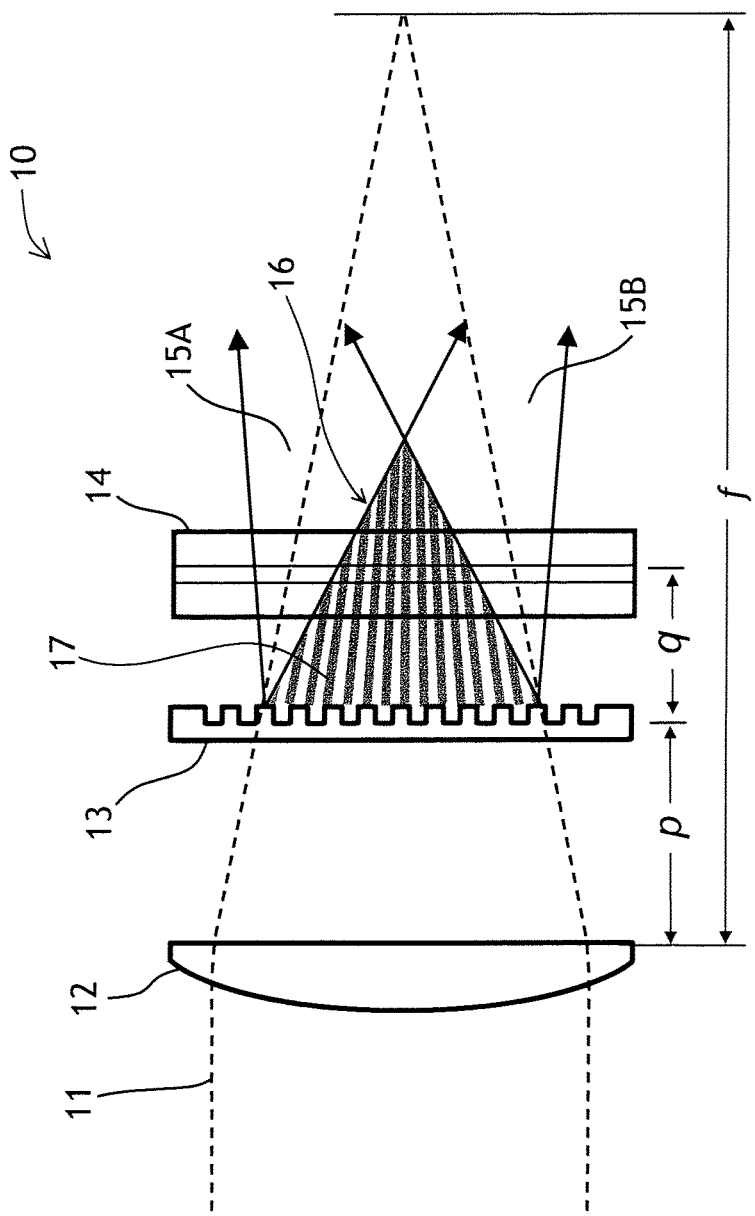
FIG. 1 is a schematic top view of a prior-art grating writing apparatus.
Figure 2:
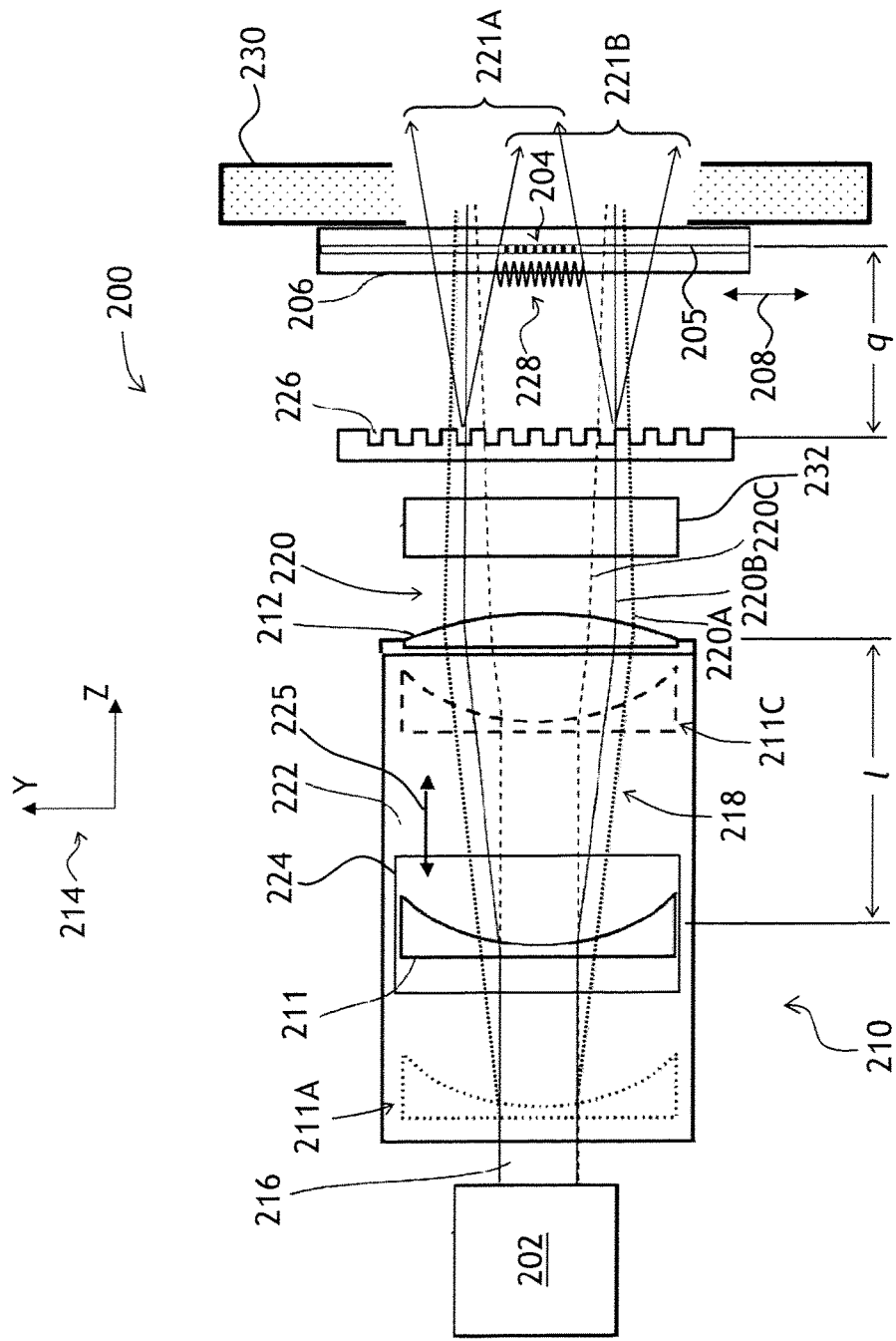
FIG. 2 is a schematic top view of a grating writing apparatus according to the invention.

Referring to FIG. 2, an apparatus 200 of the invention is used with a pulsed laser source 202 for forming an optical grating 204 in a core 205 of an optical fiber 206 extending in a first direction 208, that is, Y-direction of a coordinate system 214. The apparatus 200 includes a cylindrical telescope 210, which includes a concave cylindrical lens 211 and a convex cylindrical lens 212. The concave cylindrical lens 211 has negative optical power, or defocusing power, in YZ plane (coordinate system 214) including the first direction 208. The convex cylindrical lens 212 has positive optical power, or focusing power, in the YZ plane. In operation, the concave cylindrical lens 211 increases divergence of a "first" optical beam 216 emitted by the laser source 202, forming a diverging optical beam 218. The convex cylindrical lens 212 is disposed in an optical path of the diverging optical beam 218 downstream the concave cylindrical lens 211. The convex cylindrical lens 212 receives the diverging optical beam 218 and decreases the divergence of the diverging optical beam 218, forming a "second" optical beam 220. Herein and throughout the rest of the specification, the terms "first", "second", and the like do not imply an order of elements. Rather, they are merely used as identifiers. A telescope support 222 is provided for supporting the concave 211 and convex 212 cylindrical lenses of the cylindrical telescope 210. The telescope support 222 includes a movable portion 224 supporting the concave cylindrical lens 211, for adjusting a distance/between the concave 211 and convex 212 cylindrical lenses along a direction 225 parallel to the Z axis, thereby adjusting a divergence of the second optical beam 220. In one embodiment, the movable portion 224 may support the convex cylindrical lens 212, and the concave cylindrical lens 211 may be fixed to the telescope support 222. At least one of, or both the concave 211 and convex 212 cylindrical lenses may be mounted on a movable support member or members, such as the movable portion 224, to vary the distance/between the concave 211 and convex 212 cylindrical lenses of the telescope 210.

A phase mask 226 is disposed in an optical path of the second optical beam 220. In operation, the phase mask 226 splits the second optical beam 220 into first 221A and second 221B sub-beams overlapping on the optical fiber 206 and forming an optical interference pattern 228 on the optical fiber 206. The optical interference pattern 228 extends in Y-direction 208, that is, along the optical fiber 206. In operation, the optical interference pattern 228 forms the optical grating 204 in the core 205 of the optical fiber 206. The phase mask 226 is essentially a phase diffraction grating. An amplitude diffraction grating may also be used in place of the phase mask 226. More generally, a transmission diffraction grating including both amplitude and phase gratings, may be used; the phase mask 226 is therefore only an example.

The optical interference pattern 228 has a period dependent on the divergence of the second optical beam 220. As a result, a period of the optical grating 204 is adjustable by adjusting the distance l between the concave 211 and convex 212 cylindrical lenses of the telescope 210. The effective focal length $f_{\mathit{eff}}$ of the telescope 210 is given by $$\frac{1}{f_{\mathit{eff}}} = \frac{1}{f_1} + \frac{1}{f_2} - \frac{l}{f_1 f_2} \qquad (4)$$

wherein $f_1$ is a focal length of the concave cylindrical lens 211, and $f_2$ is a focal length of the convex cylindrical lens 212. In the embodiment shown, $f_1$ has a negative value, and $f_2$ has a positive value.

The effective focal length $f_{\it{eff}}$ and, therefore, a curvature of the wavefront of the second optical beam 220 incident on the phase mask 226 can be varied by displacing the movable portion 224, thereby changing the distance l between the concave 211 and convex 212 cylindrical lenses. When the concave cylindrical lens 211 is at a position 211A shown with dotted lines, $l>f_1+f_2$, the second optical beam 220 exiting the telescope 210 at the convex cylindrical lens 212 is converging as shown with dotted lines 220A, and has a positive $f_{\it{eff}}$. When the foci or focal points of the concave 211 and convex 212 cylindrical lenses overlap spatially, $l=f_1+f_2$, the second optical beam 220 exiting the telescope 210 is collimated as shown with solid lines 220B, and the curvature to the wavefront of the second optical beam 220 incident on the phase mask 226 is removed. When the concave cylindrical lens 211 is at a position 211C shown with dashed lines, $l>f_1+f_2$, the second optical beam 220 exiting the telescope 210 at the convex cylindrical lens 212 is diverging as shown with dashed lines 220C. For the case shown in FIG. 2, when only two sub-beams i.e. 221A and 221B are interfering to produce the interference pattern 228, $\Lambda>\Lambda_{mask}/2$ for the diverging second optical beam 220, while $\Lambda<\Lambda_{mask}/2$ for the converging second optical beam 220. By adjusting the distance l between the concave 211 and convex 212 cylindrical lenses, one may tune the grating period to compensate for manufacturing or design variations. Large changes can be made to manufacture gratings with different specifications. Furthermore, one grating may be written over another with differing resonance wavelength but with the same phase mask. Such multi-wavelength gratings can be particularly useful in compound sensors. Grating chirp may also be controlled to provide a more complex spectral response.

By way of a non-limiting example, referring to FIG. 2 and Eq. (4), when the phase mask 226 with a pitch of 1.071 micrometers is exposed using the concave cylindrical lens 211 having the focal length $f_1=-100$ mm and the convex cylindrical lens 212 having the focal length $f_2=200$ mm, and the optical fiber 206 is placed 5 mm behind the phase mask 226 (that is, q=5 mm), and a distance between convex cylindrical lens 212 and the phase mask 226 is 20 mm, then adjustments to the lens separation l from 0 mm to 175 mm will result in Bragg gratings with resonances $\lambda_{Br}$ between 1586 nm and 1519 nm, essentially over an entire telecommunication C Band.

In the embodiment shown, the apparatus 200 includes a fiber holder 230 for holding the optical fiber 206, so that the optical fiber 206 extends in the first direction 208, that is, along Y-axis. The fiber holder 230 is shown in a partially cut-out view. To better concentrate light energy on the optical fiber 206, the apparatus 200 may include a concentrator lens 232, or "inscription lens" 232. The concentrator lens 232 has a positive optical power in a plane perpendicular to the Y-axis. The concentrator lens 232 is disposed in an optical path of the second optical beam 220, that is, downstream of the convex cylindrical lens 212, but can also be disposed in an optical path of the first optical beam 216, upstream of the convex cylindrical lens 212; or even in an optical path between the phase mask 226 and the optical fiber 206, if space permits. In operation, the concentrator lens 232 concentrates the optical interference pattern 228 into a line of focus on the optical fiber 206, to enhance a grating writing ("inscribing") efficiency. Another optical element having positive optical power in a plane perpendicular to the Y-axis, for example a diffractive optical element, may be used instead of the concentrator lens 232.

In accordance with the invention, the laser source 202 includes a pulsed laser source having an ultrashort pulse duration of no greater than 10 ps. In one embodiment, the laser source 202 is a femtosecond laser source having a pulse duration of less than 1 ps, preferably at pulse energy of at least 1 micro-Joule. An advantage of using a femtosecond laser source, such as a regeneratively amplified Ti:sapphire laser, has been described by Mihailov et al. in U.S. Pat. No. 7,031,571, incorporated herein by reference. According to Mihailov et al., a distance q between the phase mask 226 and the optical fiber 206 can be several millimeters when a femtosecond laser source is used. A near-infrared range including wavelengths between 800 nm and 1600 nm may be preferable for being able to write gratings through protective coating polymer materials in fused silica optical fiber targets. Furthermore, the use of near infrared radiation alleviates a requirement to remove and reapply protective polymer coatings to optical fibers for grating inscription. There are advantages of using femtosecond pulses in visible and UV wavelength ranges, as well. Multiphoton absorption is generally much more efficient in the visible and UV ranges than in the infrared, lowering the pulse energy requirements for the laser source 202 operating at UV and visible wavelengths e.g. between 190 nm and 650 nm.

The first optical element of the telescope 210, that is, the concave cylindrical lens 211, defocuses the first optical beam 216, thus avoiding creation of a tight focal spot inside the telescope 210. Focusing of high power femtosecond pulses may cause ionization of air in the region of the focus, resulting in distortions of a wavefront of the second optical beam 220. Thus, using the first optical element of the telescope 210 having negative optical power in the YZ plane 214, that is, defocusing power in the YZ plane 214, enables one to avoid issues with tight focusing of the first optical beam 216, improving wavefront quality of the second optical beam 220 and, as a result, improving overall quality of the grating 204.

Mihailov et al. demonstrated in an article entitled "Bragg Gratings Written in All-SiO$_2$ and Ge-Doped Core Fibers With 800-nm Femtosecond Radiation and a Phase Mask" published in the Journal of Lightwave Technology vol. 22 no. 1 p. 94 (2004) and incorporated herein by reference, that due to the nonlinearity of the mechanism for induced index change resulting from femtosecond IR irradiation, a Bragg grating made using this method is characterized by a non-sinusoidal index modulation or Δn that results in high-order spectra generated by the Bragg grating, such that:

$$m\lambda_{Br}=2n_{\it{eff}}\Lambda \quad (5)$$

wherein m is the diffracted order of a Bragg grating resonance and $n_{\it{eff}}$ is an effective refractive index of the guided core mode of the optical fiber 206. From Equations (2) and (5), to produce a grating which has a high diffracted order resonance, the pitch of the phase mask $\Lambda_{mask}$ is defined to be:

$$\Lambda_{mask} = \frac{m\lambda_{Br}}{n_{\it{eff}}} \quad (6)$$

By using phase masks designed to produce high order Bragg resonances according to equation (6), diffractive order spreading is further reduced, allowing for larger phase mask 226 to fiber 206 separations q, which in their turn enable larger wavelength tuning ranges. For example, a pitch (period) of the phase mask 226 needed to make a third order (m=3) Bragg grating that is resonant at 1550 nm ($\lambda_{Br}$=1550 nm) within a single mode telecom fiber with an effective index of refraction $n_{eff}$=1.447 would need to be $\Lambda_{mask}$=3.213 micrometers. A similar mask producing a fundamental Bragg resonance (m=1) at 1550 nm would need to have a $\Lambda_{mask}$=1.071 micrometers. As mask pitch increases, the phase mask diffracted order angles decrease for a given illumination wavelength, allowing increased fiber to phase mask separations q.

To determine a proper fiber to phase mask separations q, two issues need to be considered. The first issue is that larger pitches $\Lambda_{mask}$ result in reduced diffraction angles of first diffraction orders, that is, the diffraction angles of the first 221A and second 221B sub-beams. The second issue is that shorter distances are needed to interfere multiple diffraction orders, which is facilitates writing thermally stable gratings.

When the pitch $\Lambda_{mask}$ of the phase mask 226 increases, for example from 1.071 micrometers to 3.213 micrometers, the diffracted angles of the interfering first 221A and second 221B sub-beams at the wavelength of 800 nm are reduced from 48.2° (relative to the phase mask 226 normal) to 14.4°. At the distance of 3 mm away from the phase mask 226, most of the first 221A and second 221B sub-beams are no longer overlapping for a 6.4 mm diameter second optical beam 220 when $\Lambda_{mask}$=1.071 micrometers; while at this distance of 3 mm, the first 221A and second 221B sub-beams are mostly overlapping when $\Lambda_{mask}$=3.21 micrometers. Therefore, for longer pitches $\Lambda_{mask}$, the overlap of the first 221A and second 221B sub-beams occurs a distances farther away from the phase mask 226.

To write fiber gratings that are the same pitch as the pitch $\Lambda_{mask}$ of the phase mask 226, rather than ½ the pitch $\Lambda_{mask}$, all diffracted orders need to be overlapping on the optical fiber 206. This is important for fabricating Bragg gratings that are thermally stable, since the peak intensities of the multiple order interference pattern are much higher than in the two beam interference pattern between the first 221A and second 221B sub-beams. For the long-pitch phase mask 226 having $\Lambda_{mask}$=1.071 micrometers, this multiple beam interference occurs at distances from the surface of the phase mask 226 to a distance of up to 100 micrometers away. From 100 micrometers distance from the mask to e.g. 5 mm distance, the interference occurs only between the first 221A and second 221B sub-beams, and not the $0^{th}$ order. For the second optical beam 220 diameter of 6.4 mm, the first 221A and second 221B sub-beams will no longer be overlapping 5 mm away from the phase mask 226.

In the case of the long-pitch phase mask 226 having $\Lambda_{mask}$=3.21 micrometers, up to 1 mm away the first 221A and second 221B sub-beams are still overlapping with the $0^{th}$ order, producing an interference pattern with the same pitch as $\Lambda_{mask}$. Beyond 1 mm distance, only the first 221A and second 221B sub-beams are overlapping. For the 6.4 mm diameter second optical beam 220, the first 221A and second 221B sub-beams will no longer be overlapping 20 mm away from the phase mask 226.

Therefore, one can write gratings up to 20 mm away (q≤20 mm) for a 6.4 mm diameter second optical beam 220 using the phase mask 226, that produces a $3^{rd}$ order Bragg grating. This Bragg grating is produced at distances beyond "the order walk off distance" d defined in U.S. Pat. No. 7,031,571 by Mihailov et al. For practical purposes, the range of q≤20 mm may be selected, although even larger distances >20 mm are still possible.

Figure 3:
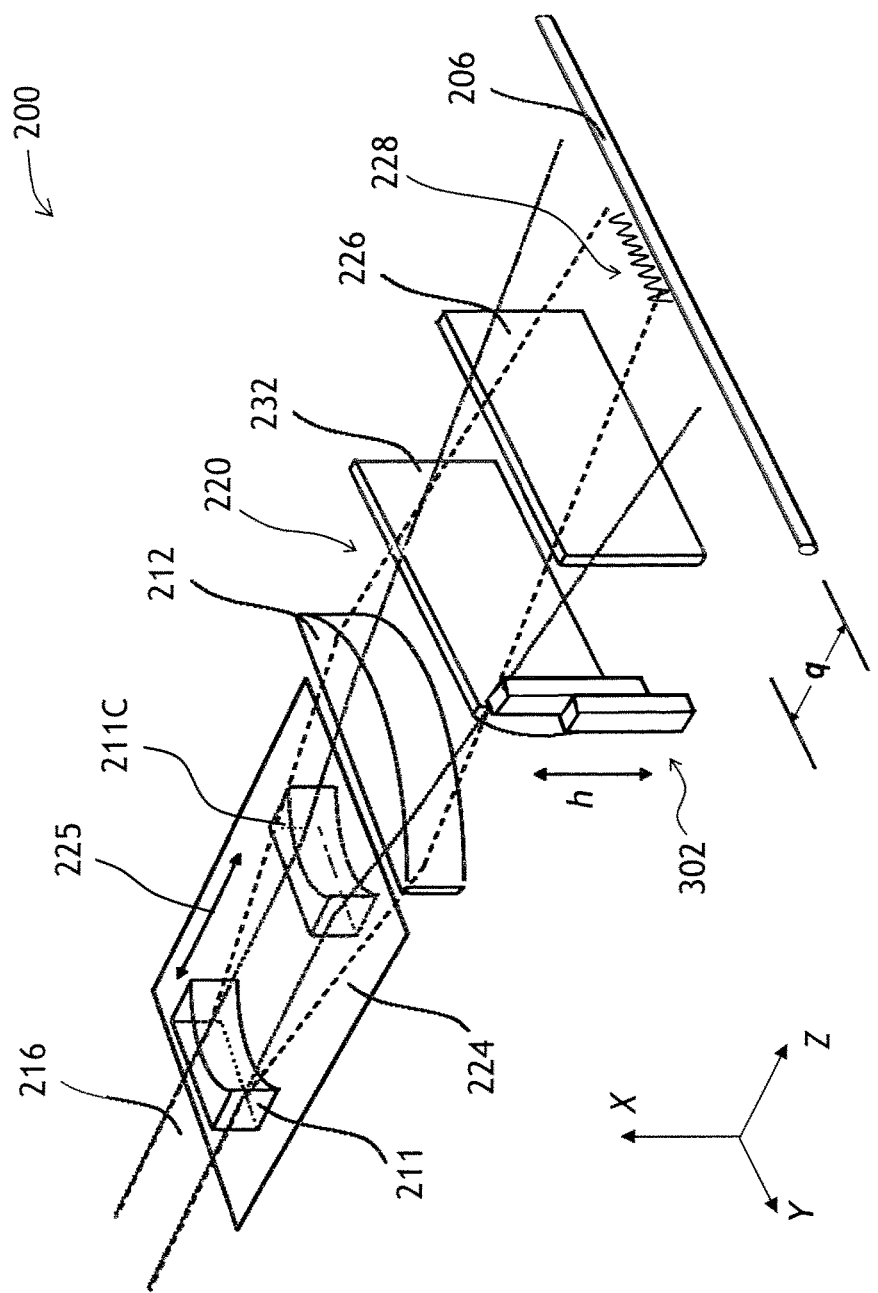
FIG. 3 is an isometric view of the apparatus of FIG. 2.

Turning to FIG. 3, the apparatus 200 is shown in an isometric view. The distance l between the concave 211 and convex 212 cylindrical lenses can be adjusted by moving either of the concave 211 and convex 212 cylindrical lenses along the direction 225, that is, parallel to Z-axis, towards and away from the position 211C, thereby adjusting the divergence of the second optical beam 220 propagating through the concentrator lens 232 and impinging on the phase mask 226. In a preferred embodiment, the apparatus 200 includes a movable mount 302 on which the concentrator lens 232 is mounted, configured for moving the concentrator lens 232 along X-axis, that is, vertically in FIG. 3 and perpendicular to the optical fiber 206. In one embodiment, the movable mount 302 is adapted to continuously vary a height h of the concentrator lens 232, to vertically sweep the second optical beam 220 and the optical interference pattern 228 across the optical fiber 206. The vertical sweeping facilitates uniform exposure of the optical fiber 206 by the light interference pattern 228. The movable mount may include a translation stage, a flexure-based mount, a piezo mount, and the like.

Figure 4:
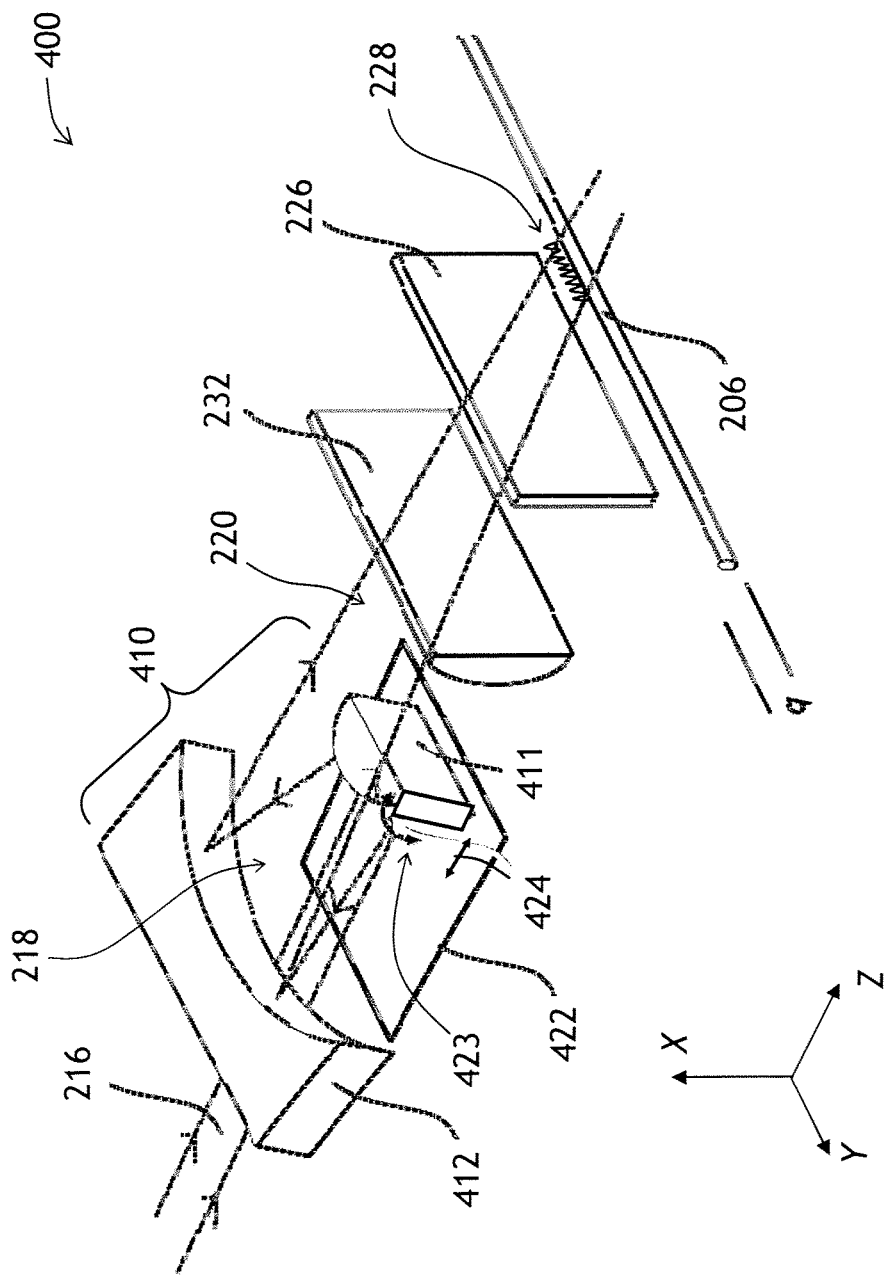
FIG. 4 is an isometric view of a reflective embodiment of a grating writing apparatus according to the invention.

In cases where the pulse duration of the first optical beam 216 ("writing beam") is very short, for example 20 fs or less, the pulse may undergo excessive dispersion, broadening, and may be subject to non-linear optical interactions when propagating through refractive optics. Referring to FIG. 4, an apparatus 400 of the invention for forming an optical grating is a "reflective" variant of the apparatus 200 of FIGS. 2 and 3. In the apparatus 400 of FIG. 4, convex 411 and concave 412 cylindrical mirrors are used instead of the concave 211 and convex 212 cylindrical lenses, respectively. The convex 411 and concave 412 cylindrical mirrors form a reflective telescope 410. The use of reflective elements, specifically the convex 411 and concave 412 cylindrical mirrors, allows one to lessen broadening of femtosecond laser pulses caused by chromatic dispersion and nonlinear effects.

In operation, the first optical beam 216 impinges on the convex cylindrical mirror 411, propagating under the concave cylindrical mirror 412. The resulting diverging laser beam 218 is then incident on the concave cylindrical mirror 412. The resulting second optical beam 220 then propagates through the concentrator lens 232 and the phase mask 226, impinging onto the optical fiber 206 disposed at the distance q from the phase mask 226. The convex cylindrical mirror 411 may be placed on a tilt stage 423 that is mounted on a movable portion 424 of a telescope support 422. The concave cylindrical mirror 412 may be similarly tilted about Y-axis as shown in FIG. 4, to offset the Y-axis tilt of the convex cylindrical mirror 411. As the mirrors 411 and 412 separation is adjusted by the movable portion 424, the tilt of the convex mirror 411 may also have to be adjusted to ensure that the second optical beam 220, when focused through the concentrator lens 232, is incident on the optical fiber 206. One may sweep the optical interference pattern 228 at the focus of the second optical beam 220 across the optical fiber 206 by varying the tilt of the concave cylindrical mirror 411, or by varying the height of the concentrator lens 232 as explained above.

Referring to FIGS. 2 and 4, the apparatus 400 of FIG. 4 uses the reflective telescope 410 instead of the refractive cylindrical telescope 210 of the apparatus 200 of FIG. 2. More generally, the telescope 210 may include two optical elements having optical power, that is, a focusing or defocusing capability, in the YZ plane. The first optical element (e.g. the concave cylindrical lens 211) has a negative optical power, and the second optical element (e.g. the convex cylindrical lens 212) has a positive optical power. The elements may be reflective, refractive, diffractive, etc. Furthermore, the first and second optical elements are not limited to cylindrical or anamorphic optics only. Spherical or aspherical optical elements may be used, for example. Anamorphic optics are preferable for elongate inscription targets, such as the optical fiber 206. It is to be understood, however, that the present invention is not limited to optical fibers as inscription targets. Other types of targets, e.g. fused silica or glass plates, or other optical elements may be inscribed, using an apparatus exemplified by the apparatus 200 of FIGS. 2 and 3 or the apparatus 400 of FIG. 4.

Figure 5:
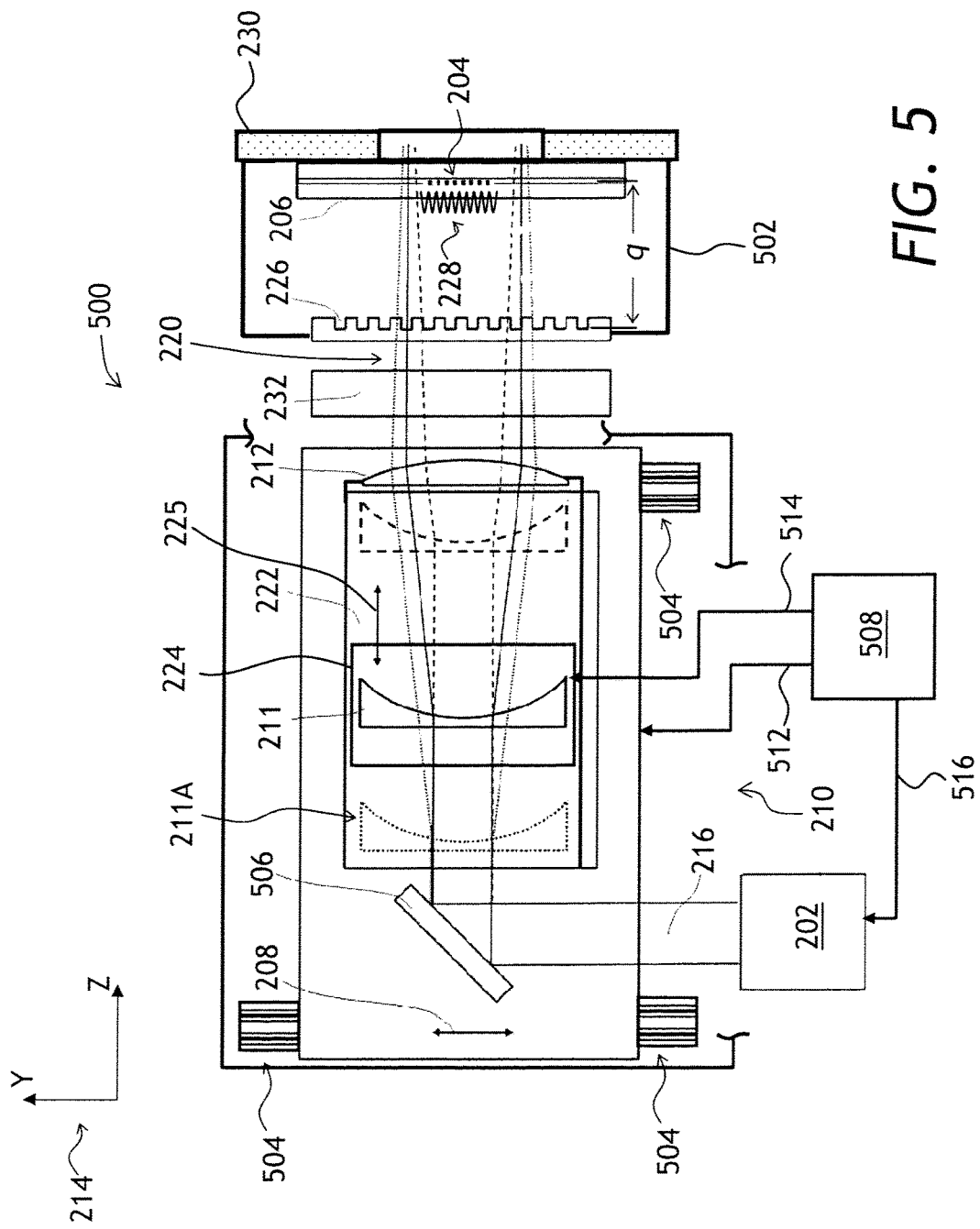
FIG. 5 is a top schematic view of an embodiment of a grating writing apparatus according to the invention, having a translatable telescope.

Turning now to FIG. 5, an apparatus 500 of the invention can be used with the pulsed laser source 202 for forming an optical grating. The apparatus 500 is a variant of the apparatus 200 of FIGS. 2 and 3, and the apparatus 400 of FIG. 4. The apparatus 500 of FIG. 5 includes all the elements of the apparatus 200 of FIG. 2. The apparatus 500 of FIG. 5 further includes a joining member 502 for holding the fiber holder 230 and the phase mask 226 at the fixed distance q from each other. This is beneficial for manufacturing, because grating parameters, such as reflectivity and bandwidth, are very sensitive to the distance q, and random variations of the distance q might cause unacceptable manufacturing variations of the grating parameters. The apparatus 500 may also include a translator 504 mechanically coupled to the joining member 502 e.g. by coupling to a common substrate, not shown, and the telescope 210, for displacing the telescope 210 in the Y-direction 208 relative to the joining member 502 keeping the fiber holder 230 and the phase mask 226 in a fixed apart relationship, at the distance q. The translator 504, and the movable portion 224, for that matter, may include a motorized translation stage.

The first optical beam 216 generated by the pulsed laser 202 impinges on a turning mirror 506, which couples the first optical beam 216 to the concave cylindrical lens 211. When the first optical beam 216 is coupled to the concave cylindrical lens 211 in this manner, the cylindrical telescope 210 may be translated essentially without disturbing the optical alignment. Alternatively, the joining member 502 may be translated relative to the telescope 210.

A controller 508 may be operationally coupled to the translator 504 and the telescope support 222 with links 512 and 514, respectively, and configured to cause the translator 504 to displace the telescope 210 in the Y-direction 208 relative to the joining member 502, while causing the telescope support 222 to displace the concave cylindrical lens 211 relative to the convex cylindrical lens 212. The two displacements are coordinated with each other, so that peaks, or interference fringes, of the optical interference pattern 228 substantially do not shift on the optical fiber 206 when the translator 504 displaces the telescope 210 relative to the joining member 502, or the joining member 502 relative to the telescope 210. At the very least, the shift of the peaks is lessened by the coordinated movement. In this manner, chirped fiber gratings may be formed in the optical fiber 206. The controller 508 may control the laser 202 via a laser link 516. By way of a non-limiting example, such parameters as laser ON and OFF, laser power, and laser wavelength may be controlled via the laser link 516. The controller 508 may also control a displacement of the concentrator lens 232 along the X-axis, that is, in and out of plane of FIG. 5. In one embodiment, the telescope 210 is translated along the Y-direction 208 in a step and repeat fashion, wherein after each step the second optical beam 220 is swept across the optical fiber 206 by sweeping the concentrator lens 232 along the X-axis.

Figure 6A:
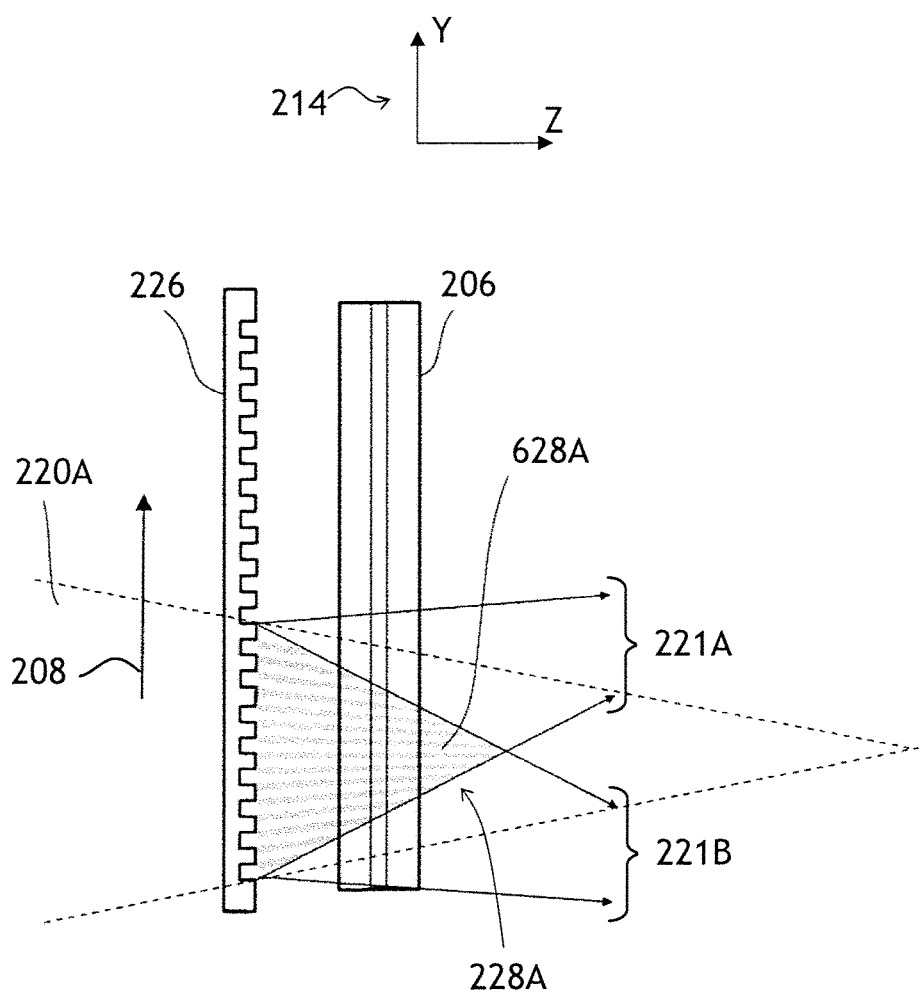
FIGS. 6A to 6C are top schematic views of the apparatus of FIG. 5 during writing of a chirped grating.
Figure 6B:
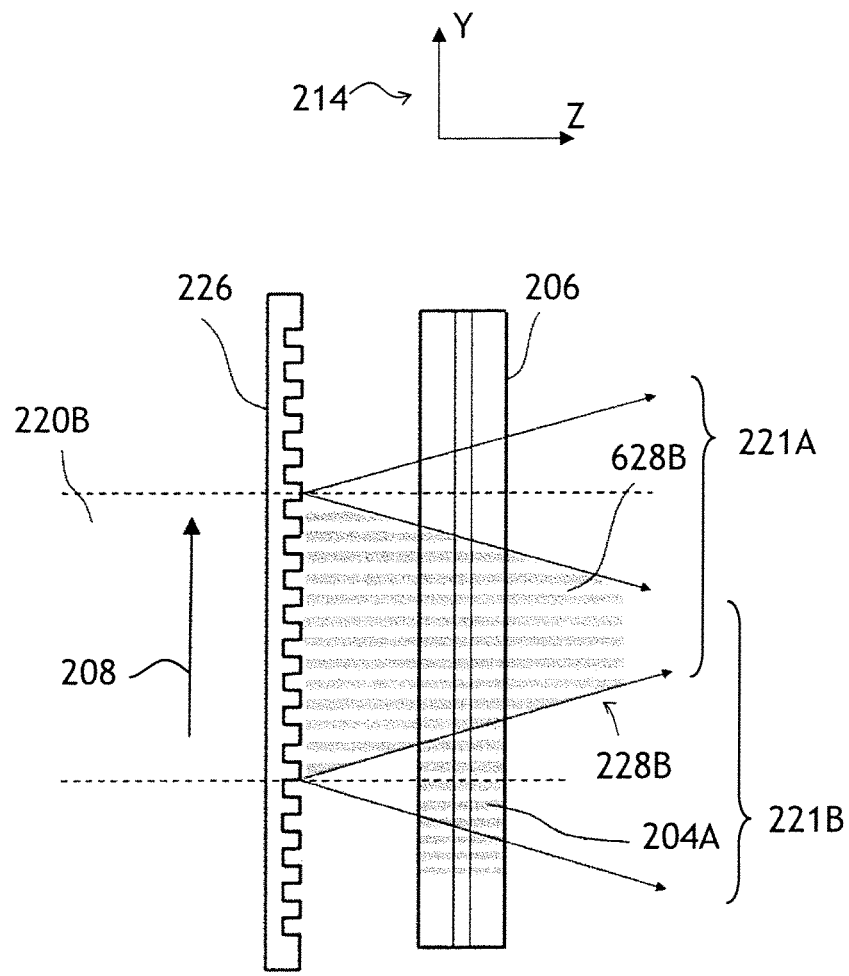
Figure 6C:
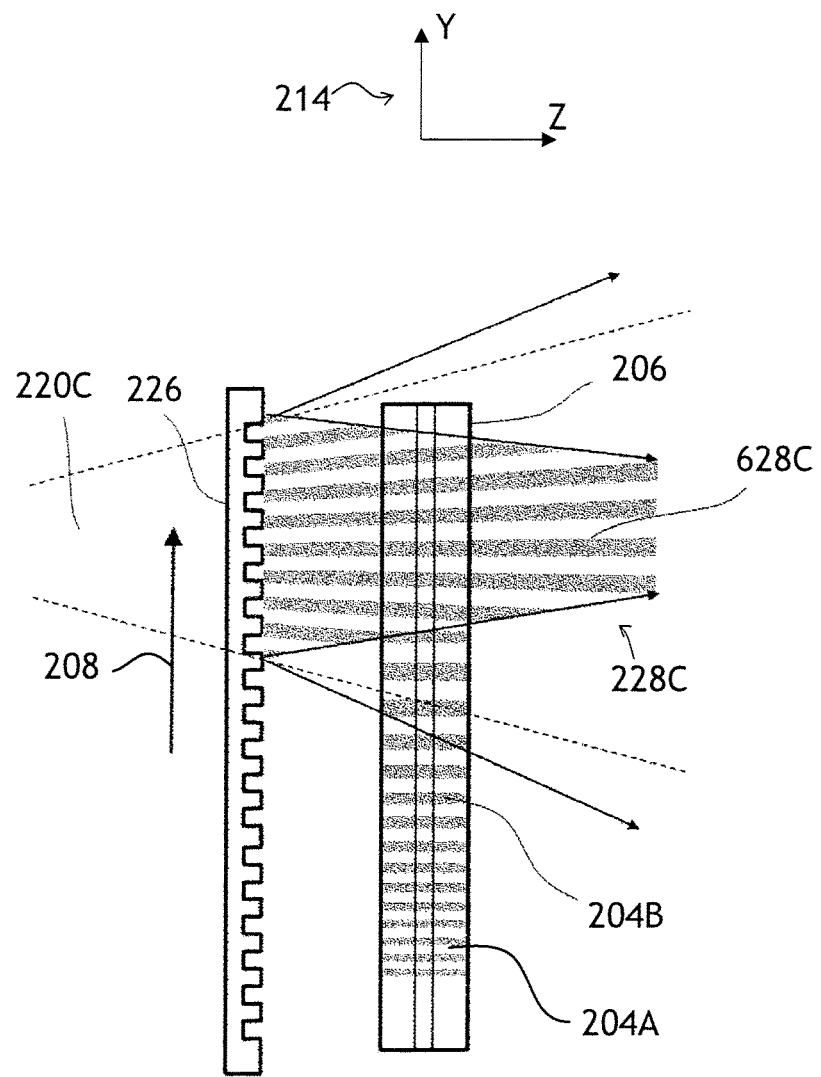

The process of writing a chirped grating is further illustrated in FIGS. 6A, 6B, and 6C with further reference to FIG. 5. Three progressive stages of the writing process are shown in FIGS. 6A, 6B, and 6C. Referring specifically to FIG. 6A, the optical fiber 206 is illuminated by the converging second optical beam 220A creating a light interference pattern 228A having interference fringes 628A "converging" along the Z-axis, that is, in going from left to right in FIG. 6A. As the translator moves the telescope 210 in Y-direction 208, the controller 508 causes the telescope support 222 to displace the concave cylindrical lens 211 relative to the convex cylindrical lens 212, so as to make the second optical beam 220 more collimated. In FIG. 6B, the optical fiber 206 is illuminated by the collimated second optical beam 220B creating a light interference pattern 228B having parallel interference fringes 628B. A first portion 204A of the grating 204 (FIG. 5) is already inscribed. Turning to FIG. 6C, the optical fiber 206 is illuminated by the diverging second optical beam 220C creating a light interference pattern 228C having interference fringes 628C diverging in the Z-direction. A second portion 204B (FIG. 6C) of the grating 204 (FIG. 5) is already inscribed proximate to the first portion 204A (FIG. 6C). The movement of the telescope 210 is coordinated with the translation of the movable portion 224 on which the concave cylindrical lens 211 is mounted, so as to lessen a shift of interference fringes 211 in Y-direction on the optical fiber 206 during the movement of the telescope 210.

Figure 7:
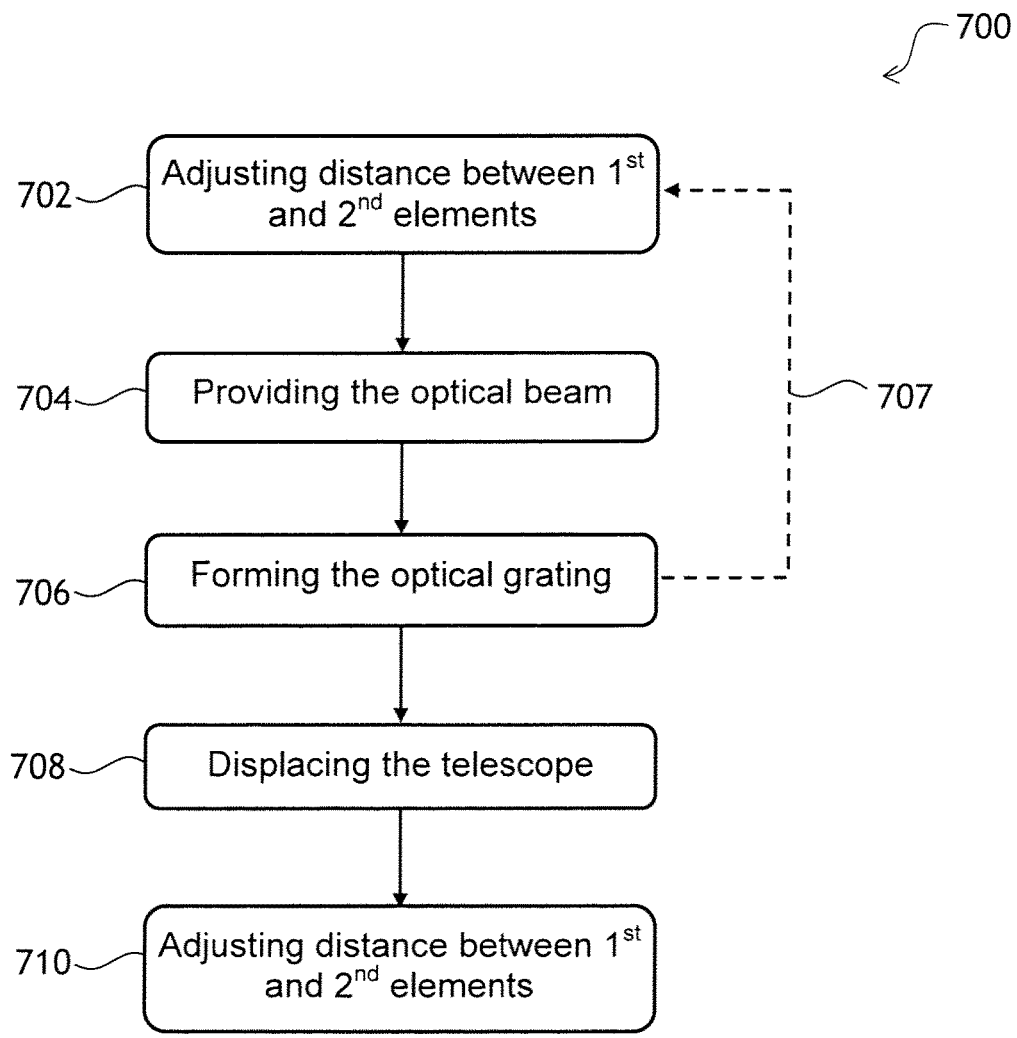
FIG. 7 is a flow chart of a method for forming an optical grating using an apparatus of the invention.

Referring to FIG. 7 with further reference to FIGS. 2 to 5, a method 700 for forming an optical grating in a target using the apparatus 200 of FIGS. 2 and 3, the apparatus 400 of FIG. 4, or the apparatus 500 of FIG. 5, includes a step 702 of adjusting the distance between first and second optical elements of a telescope. By way of a non-limiting example, the distance between the concave 211 and convex 212 cylindrical lenses of the cylindrical telescope 210 of the apparatus 200 of FIG. 2, or between the convex 411 and concave 412 cylindrical mirrors of the reflective telescope 410 of the apparatus 400 of FIG. 4 may be adjusted. As a result of adjusting the distance between the first and second optical elements, the period of the optical interference pattern 228 is adjusted. In a step 704, the first optical beam 216 is provided e.g. by energizing the laser source 202, and/or opening a shutter, to form the optical interference pattern 228 on the target e.g. the optical fiber 206. In a following step 706, the optical grating 204 is formed in the target.

In the embodiment shown in FIG. 5, the optical fiber 206 is held extending in the Y-direction 208 at a fixed distance from the phase mask 226 by using the joining member 502 holding the fiber holder 230 and the transmission diffraction grating together. The method 700 may include a step 708 of displacing one of the joining member 502 and the telescope 210 in the Y-direction 208 relative to the other of the joining member 502 and the telescope 210. In a step 710, the distance between the first and second optical elements is varied in a coordinated fashion with displacement of the step 708, so that a shift of peaks of the optical interference pattern 228 on the optical fiber 206 is lessened.

In one embodiment, the first three steps 702 to 706 of the method 700 are repeated as indicated with an arrow 707, to form in the target overlapping optical gratings 228, which may have different grating periods. In this manner, multi-wavelength gratings and apodized gratings may be formed.

In a preferred embodiment of the method 700, an ultrafast pulsed laser is used to provide the first optical beam 216 in the step 704 to form the grating 228 in the step 706.

Preferably, the first optical beam 216 has a pulse duration of no greater than 10 ps and a pulse energy of 1 micro-Joule or greater. In one embodiment, a femtosecond laser having a pulse duration of less than 1 ps is used, allowing one to write gratings in media that are not photosensitized. A wavelength range of between 190 nm and 1600 nm is preferable. This wavelength range is enabled by femtosecond fiber lasers and regeneratively amplified titanium: sapphire lasers.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An apparatus for forming an optical grating in a target extending in a first direction, the apparatus comprising:
   a telescope comprising:
   a first optical element having negative optical power in a first plane including the first direction, for receiving a first optical beam and for forming a diverging optical beam therefrom; and
   a second optical element having positive optical power in the first plane, disposed downstream of the first optical element, for receiving the diverging optical beam and for forming a second optical beam therefrom;
   a telescope support for supporting the first and second optical elements, the telescope support comprising a movable portion for adjusting a divergence of the second optical beam by adjusting a distance between the first and second optical elements; and
   a transmission diffraction grating disposed downstream of the telescope, for receiving the second optical beam and for splitting the second optical beam into first and second sub-beams;
   wherein the apparatus is configured to overlap the first and second sub-beams on the target to form an optical interference pattern on the target for forming the optical grating therein when the first optical beam is received by the first optical element, wherein the optical interference pattern has a period dependent on the divergence of the second optical beam, whereby a period of the optical grating is adjustable by adjusting the distance between the first and second optical elements of the telescope.

2. The apparatus of claim 1, further comprising a pulsed laser source coupled to the first optical element, for providing the first optical beam, wherein the first optical beam has a pulse duration of no greater than 10 ps.

3. The apparatus of claim 2, wherein the pulse duration is less than 1 ps.

4. The apparatus of claim 2, wherein the pulsed laser source is configured for operation at a pulse energy of at least 1 micro-Joule.

5. The apparatus of claim 1, wherein at least one of the first and second optical elements comprises a cylindrical lens.

6. The apparatus of claim 1, wherein at least one of the first and second optical elements comprises a cylindrical mirror.

7. The apparatus of claim 1, wherein the transmission diffraction grating comprises a phase mask.

8. The apparatus of claim 1, wherein the target comprises an optical fiber, the apparatus further comprising a fiber holder for holding the optical fiber extending in the first direction.

9. The apparatus of claim 8, further comprising a joining member for holding the fiber holder and the transmission diffraction grating at a fixed distance from each other.

10. The apparatus of claim 9, wherein the fixed distance is 20 mm or less.

11. The apparatus of claim 9, further comprising:
    a translator mechanically coupled to the joining member and the telescope, for displacing one of the joining member and the telescope in the first direction relative to the other of the joining member and the telescope; and
    a controller operationally coupled to the translator and the telescope support, and configured to: cause the translator to displace the one of the joining member and the telescope in the first direction relative to the other of the joining member and the telescope; and cause the telescope support to vary the distance between the first and second optical elements.

12. The apparatus of claim 8, further comprising a third optical element having positive optical power in a second plane perpendicular to the first direction, disposed upstream or downstream of the second optical element to concentrate the optical interference pattern on the optical fiber.

13. The apparatus of claim 12, further comprising a movable mount on which the third optical element is mounted, configured for moving the third optical element in the second plane.

14. A method for forming an optical grating in a target using the apparatus of claim 1, the method comprising:
    (a) adjusting the distance between the first and second optical elements of the telescope, to adjust the divergence of the second optical beam;
    (b) providing the first optical beam, so as to form the optical interference pattern on the target; and
    (c) forming the optical grating in the target.

15. The method of claim 14, wherein in steps (b) and (c), the first optical beam is provided by a pulsed laser source having a pulse duration of no greater than 10 ps.

16. The method of claim 15, wherein in steps (b) and (c), the pulse duration is less than 1 ps.

17. The method of claim 16, wherein in steps (b) and (c), the first optical beam has a pulse energy of 1 micro-Joule or greater.

18. The method of claim 14, wherein the target comprises an optical fiber, wherein in steps (a) through (c), the optical fiber is held extending in the first direction at a fixed distance from the transmission diffraction grating by using a joining member holding the fiber holder and the transmission diffraction grating.

19. The method of claim 18, further comprising
    (d) displacing one of the joining member and the telescope in the first direction relative to the other of the joining member and the telescope; and
    (e) while performing step (d), varying the distance between the first and second optical elements in a coordinated fashion with displacement of step (d), so as to lessen a shift of peaks of the optical interference pattern on the optical fiber.

20. The method of claim 14, further comprising repeating steps (a) through (c) to form in the target overlapping optical gratings.

* * * * *